(12) United States Patent
Komiya

(10) Patent No.: US 10,236,487 B2
(45) Date of Patent: Mar. 19, 2019

(54) BATTERY MODULE

(71) Applicant: NEC ENERGY DEVICES, LTD., Sagamihara-shi, Kanagawa (JP)

(72) Inventor: Yoshihiro Komiya, Sagamihara (JP)

(73) Assignee: NEC ENERGY DEVICES, LTD., Sagamihara-shi, Kanagawa (JP)

( * ) Notice: Subject to any disclaimer, the term of this patent is extended or adjusted under 35 U.S.C. 154(b) by 531 days.

(21) Appl. No.: 14/894,553

(22) PCT Filed: May 15, 2014

(86) PCT No.: PCT/JP2014/062921
§ 371 (c)(1),
(2) Date: Nov. 30, 2015

(87) PCT Pub. No.: WO2014/196331
PCT Pub. Date: Dec. 11, 2014

(65) Prior Publication Data
US 2016/0126516 A1    May 5, 2016

(30) Foreign Application Priority Data

Jun. 6, 2013  (JP) ................. 2013-119997

(51) Int. Cl.
*H01M 6/46* (2006.01)
*H01M 2/10* (2006.01)
*H01M 2/02* (2006.01)

(52) U.S. Cl.
CPC ....... *H01M 2/1094* (2013.01); *H01M 2/0212* (2013.01); *H01M 2/1016* (2013.01); *H01M 2/1061* (2013.01); *H01M 2/1077* (2013.01); *H01M 2220/20* (2013.01)

(58) Field of Classification Search
CPC ............ H01M 2/1094; H01M 2/0212; H01M 2/1016; H01M 2/1061; H01M 2/1077; H01M 2220/20
See application file for complete search history.

(56) References Cited

U.S. PATENT DOCUMENTS

| | | |
|---|---|---|
| 2009/0239142 A1 | 9/2009 | Suto |
| 2010/0086842 A1 | 4/2010 | Yang |
| 2013/0164578 A1* | 6/2013 | Sweet ............... H01M 10/0413 429/82 |

(Continued)

FOREIGN PATENT DOCUMENTS

| | | |
|---|---|---|
| CN | 1961438 A | 5/2007 |
| JP | 11-16546 A | 1/1999 |

(Continued)

OTHER PUBLICATIONS

International Search Report of PCT/JP2014/062921 dated Aug. 26, 2014.

(Continued)

*Primary Examiner* — Jane J Rhee
(74) *Attorney, Agent, or Firm* — Sughrue Mion, PLLC

(57) ABSTRACT

To provide a film-covered battery and a battery module having high resistance to external impact.
A frame body is placed on a peripheral portion of a film-covered battery. The frame body has a protruding portion. The peripheral portion of film-covered body is supported by the protruding portion.

7 Claims, 6 Drawing Sheets

(56) References Cited

U.S. PATENT DOCUMENTS

2013/0209850 A1    8/2013    Yokoyama et al.

FOREIGN PATENT DOCUMENTS

| | | | |
|---|---|---|---|
| JP | 11-111250 A | | 4/1999 |
| JP | 2004-103258 A | | 4/2004 |
| JP | 2006-32224 A | | 2/2006 |
| JP | 2006032224 A | * | 2/2006 |
| JP | 2009-224271 A | | 10/2009 |
| JP | 2010-244949 A | | 10/2010 |
| JP | 2012-523086 A | | 9/2012 |
| JP | 2013-191538 A | | 9/2013 |
| KR | 10 2005 0000725 A | | 1/2005 |
| WO | 2012/131798 A1 | | 10/2012 |

OTHER PUBLICATIONS

Communication dated Nov. 8, 2016, from the European Patent Office in counterpart European application No. 14807018.8.
Communication dated Feb. 4, 2017 from the State Intellectual Property Office of the P.R.C. in counterpart Application No. 201480031055.7.

\* cited by examiner

BATTERY MODULE

CROSS REFERENCE TO RELATED APPLICATIONS

This application is a National Stage of International Application No. PCT/JP2014/062921 filed May 15, 2014, claiming priority based on Japanese Patent Application No. 2013-119997, filed Jun. 6, 2013, the contents of all of which are incorporated herein by reference in their entirety.

TECHNICAL FIELD

The present invention relates to a battery module and a battery pack which incorporate a secondary battery and an electric vehicle mounted with the battery pack.

BACKGROUND ART

As a power source for a vehicle such as an electric car, an electric motorcycle, or a power-assisted bicycle or as a power source for use in a house or a building, a battery module or a battery pack incorporating a secondary battery is available, and various types of secondary batteries can be used in the battery module or battery pack. Among the various types, a lithium ion battery excellent in both mass and volume energy densities and providing high voltage per unit battery is preferably used.

The lithium ion battery includes a wound type obtained by winding, in a roll shape, a stack of strip shaped positive and negative electrodes through a separator and a stacked type obtained by stacking flat plate-positive and negative electrodes through a separator. The lithium ion battery generally has a columnar or a flat shape as a whole.

Among them, a flat-shaped lithium ion battery obtained by packaging a battery element with a film-like member has a substantially rectangular shape to be tightly housed in a device, and has a light weight. Thus, with such a flat-shaped lithium ion battery, it is possible to realize a device having high volume energy density or a high mass energy density. In particular, the light weight property is significant for a power source battery for a power motor for, e.g., a vehicle.

A film-covered battery disclosed in Patent Document 1 is lower in strength against impact than a battery housed in a casing such as an aluminum can having a large thickness. Therefore, a frame member in which an opening is formed at a position corresponding to a power generation element of the film-covered battery is disposed so as to retain a heat-welded portion at a periphery of a covering material. Further, as another structure for supporting a battery with a frame, Patent Document 2 proposes a structure in which an elastic pressurizing member is provided at a part of the frame so as to surely bring a heat radiating plate provided in the battery into tight contact with the battery.

CITATION LIST

Patent Document

Patent Document 1: JP2004-103258A
Patent Document 2: JP2012-523086A: WO2010/114317

DISCLOSURE OF THE INVENTION

Problems to be Solved by the Invention

The film-covered battery has a flexible film as a covering body and is thus different in terms of structure from a battery having, as the covering body, a can-like vessel produced in a predetermined size. More specifically, a difference in thickness of a battery element housed in the film-covered battery means a difference in an outer dimension of the film-covered battery. Accordingly, the dimension differs depending on a variation in manufacturing, not to mention depending on a size of the battery element. In the battery described in Patent Document 1 or Patent Document 2, in order to cope with a difference in thickness of the film-covered battery caused due to a difference in electric capacity of a unit battery or a manufacturing variation, it is necessary to prepare a frame of a size matching with the film-covered battery having a large thickness.

Further, when a plurality of the film-covered batteries are stacked to produce a battery module in which the film-covered batteries are housed in a battery casing, the following problem arises. That is, when a thickness of the frame is excessively large relative to the thickness of the film-covered battery, volume efficiency of the battery module is reduced as the number of the film-covered batteries to be stacked is increased. In order to cope with such a problem, it is necessary to prepare frame bodies having different sizes according to the thickness of the film-covered battery.

In a case of the battery described in Patent Document 1, an outer peripheral portion of the film-covered battery is supported by the whole periphery of frame body. Thus, in order to prevent the outer peripheral portion from being damaged, it is necessary to prepare a frame body having a uniform thickness, resulting in a necessity of forming frame bodies of various dimensions corresponding to the thickness, which wanes productivity.

Further, when the frame body described in Patent Document 1 or Patent Document 2 is used as a main retaining member for the film-covered battery, the frame body retains the peripheral portion of the film-covered battery. The peripheral portion of the film-covered battery is a portion where the films are heat fused to each other or a portion where the films are only folded over on each other, that is, a small thickness portion. Thus, the peripheral portion is easily reduced in mechanical strength and, when mechanical stress with respect to the peripheral portion is increased, the covering film may be broken, or the heat fused portion may be opened.

An object of the present invention is to provide a film-covered battery, a battery module in which a plurality of the film-covered batteries are stacked, and a battery pack in which a protective circuit is connected to the film-covered batteries and battery module, which have high durability against external impact, and a manufacturing method therefore.

Means for Solving the Problems

According to the present invention, there is provided a battery module having a plurality of stacked film-covered batteries, the film-covered batteries each including: a battery element housing that houses therein a battery element; a flange portion formed partially or entirely in a covering film around the battery element housing; and positive and negative electrode lead-out tabs. The battery module further comprising a frame body having an outer peripheral portion and an opening portion inside the outer peripheral portion. The outer peripheral portion of the frame body is disposed between the flange portions of adjacent film-covered batteries. A protruding portion is formed on a surface of the outer peripheral portion that is opposed to the flange portion so as to protrude toward the flange side. A thickness of a part of the frame body that includes the protruding portion is equal to or less than a distance obtained by subtracting a thickness of the flange portion opposite to the protruding portion from a thickness of the film-covered battery.

Advantages of the Invention

According to the present invention, it is possible to significantly reduce mechanical stress to the flange portion positioned at the outer peripheral portion of the film-covered battery. Further, since the protruding portion may be partially provided in the frame body, the protruding portion may be die-molded using a core piece even when a thickness of a unit battery is changed, thereby making it possible to provide a frame body, a battery, a battery module, and a battery pack excellent in productivity.

Further, by placing the protruding portion on a part of the flange portion at which the electrode lead-out tabs are drawn, it is possible to protect a part of the flange portion where the electrode lead-out tabs exist and where mechanical stress is most easily applied from impact.

In particular, even when the battery module is a type that is used in an environment always subjected to vibration and impact, like a battery module incorporated in a battery module used in an electric car, an electric motorcycle, or a power-assisted bicycle or a battery module incorporated in a battery pack, it is possible to provide a battery module capable of stably operating over a long time and having a high degree of freedom of layout when being incorporated in the power-assisted bicycle or the like.

BEST MODE FOR CARRYING OUT THE INVENTION

Figure 1:
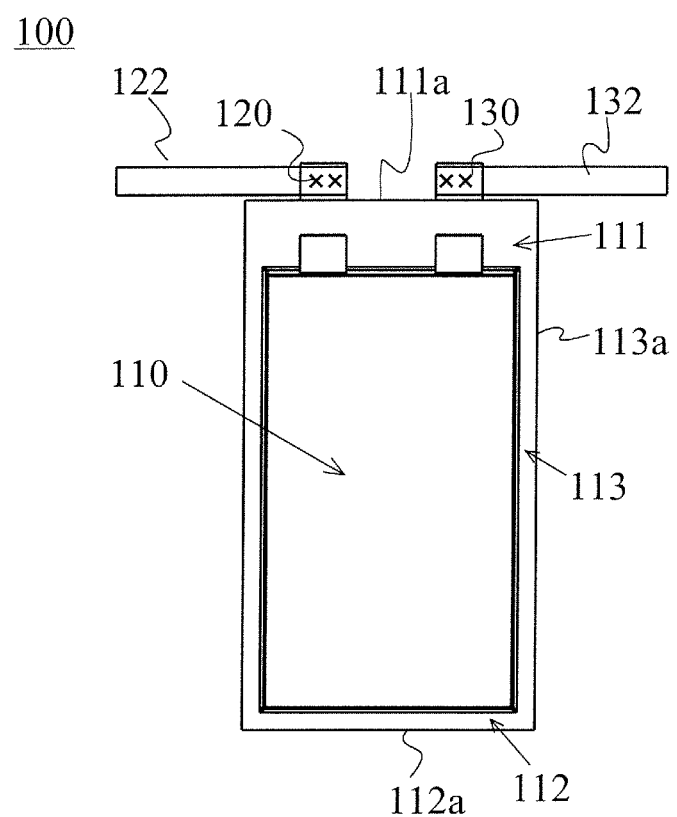
FIG. 1 is a view illustrating an example of a film-covered battery used in a battery module according to the present invention.

FIG. 1 is a view illustrating an example of a film-covered battery used in the present invention. A film-covered battery 100 is covered with a film covering material in which films having high weather resistance are stacked on an outer surface side thereof and heat-weldable films are laminated on an inner surface side thereof. For example, films having high weather resistance, such as polyamide films or polyethylene terephthalate films are stacked on an outer surface side of an aluminum foil, and heat-weldable synthetic resin films such as polyethylene films are laminated on an inner surface side thereof.

The film-covered battery houses a battery element, electrolyte, and the like in a battery element housing 110 of the film covering material, and a positive electrode lead-out tab 120 and a negative electrode lead-out tab 130 are drawn outside the film covering material.

As the battery element, a battery element obtained by laminating a positive electrode supporting a positive electrode active material and a negative electrode supporting a negative electrode active material through a separator, a battery element obtained by winding a stack of a strip shaped positive and negative electrodes through a separator in a roll shape, or a battery element obtained by pressurizing the wound stack of the positive and negative electrodes in a flat shape is used.

One end of the positive electrode lead-out tab is electrically connected to the positive electrode, and the other end thereof is drawn outside the film covering material. One end of the negative electrode lead-out tab is electrically connected to the negative electrode, and the other end thereof is drawn outside the film covering material.

One end of a positive electrode extension tab 122 can be jointed to the positive electrode lead-out tab 120 of the film-covered battery 100 by a welding means such as a spot welding or an ultrasonic welding. In FIG. 1, the one end of the positive electrode extension tab 122 is jointed to a leading end of the positive electrode tab, and the other end of the positive electrode extension tab is disposed so as to be directed in a perpendicular direction to the drawing direction of the positive electrode lead-out tab, that is, directed to a side where the negative lead-out tab does not exist.

Further, a negative electrode extension tab 132 whose one end is jointed to the negative electrode lead-out tab 130 is drawn in a direction opposite to the drawing direction of the positive electrode extension tab 122.

The positive and negative electrode extension tabs may be formed of nickel or a nickel alloy.

The film covering material includes an upper end portion 111, an upper end portion outer edge 111a, a lower end portion 112, a lower end portion outer edge 112a, a side portion 113, a side portion outer edge 113a.

In FIG. 1, a direction of the upper end portion 111 corresponds to the drawing direction of the positive and negative lead-out tabs. A flange portion including the upper end portion 111, a lower end portion 112, and side portion 113 is partially or entirely sealed by heat-welding after injection of electrolyte into the battery element housing, allowing the electrolyte to be held inside the film covering material.

The film covering material may be used as follows. For example, four sides at outer edges of two film covering materials disposed on both surfaces of the battery element are heat-welded. Alternatively, a single film covering material is folded at a center thereof to cover the both surfaces of the battery element, and then the remaining three sides are heat-welded after injection of the electrolyte. That is, the sealed portion may be appropriately changed.

The positive electrode lead-out tab 120 and the negative electrode lead-out tab 130 may both be drawn from the upper end portion outer edge or lower end portion outer edge or may be separately drawn from the opposing outer edges.

For descriptive convenience, one end portion from which at least one of the positive and negative electrode lead-out tabs 120 and 130 is drawn is referred to be the upper end portion, the other end portion opposite to the one end portion is referred to as the lower end portion, and an end portion different from both the upper and lower end portions is referred to as the side portion. However, this does not mean that the upper end portion is positioned above the lower end portion in a vertical direction opposite to the ground.

In an example of a configuration of the film-covered battery of the present invention, a lithium-transition metal composite oxide such as a lithium-manganese composite oxide or a lithium cobalt composite oxide may be used as the active material for the positive electrode of the battery body. Further, a conductivity imparting material or other additives may be added to the above active material as needed. As a current collecting foil, metal such as an aluminum foil that is stable even when a positive potential is applied thereto can be taken as an example.

Further, as the negative electrode, it is possible to use a negative electrode obtained by applying a slurry obtained by mixing a carbon material capable of doping and dedoping lithium, a conductivity imparting material such as carbon black, binder, and the like to a copper foil, followed by drying.

Examples of a storage element that uses the film covering material and has the positive and negative lead-out tabs which are drawn outside the film covering material include an electric double-layer capacitor and a lithium ion capacitor. A configuration of a portion where the battery stacked body of the present invention is housed in the covering film may be applied to the above storage elements.

Figure 2:
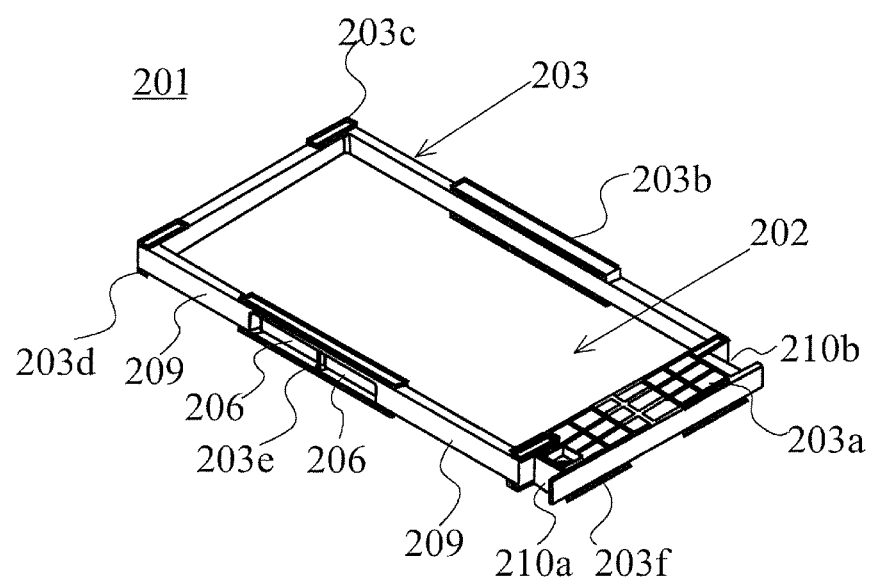
FIG. 2 is a view illustrating an example of a frame body to be attached to the film-covered battery used in the battery module according to the present invention.

FIG. 2 is a view illustrating an example of a frame body to be attached to the film-covered battery of the present invention.

A frame body 201 is produced using molding of a synthetic resin, such as ABS or polycarbonate, having high strength. The frame body 201 has, inside a frame part 203 corresponding to the flange portion of the outer peripheral portion of the film-covered battery (not illustrated), a space part 202 corresponding to the battery element housing.

A protruding portions 203a, 203b, 203c, 203d, 203e, and 203f protrude from a surface of the frame part 203 of the frame body 201 toward the flange side so as to be opposed to the flange portion of the film-covered battery.

The protruding portion 203a is provided at a position on the surface of the frame body opposite to a position on the flange portion of the film-covered battery described in FIG. 1 at which one electrode lead-out tab is disposed, and the protruding portion 203f is provided at a position on the surface of the frame body opposite to a position at which the other electrode lead-out tab is disposed.

Further, the protruding portions are provided at positions other than those at which the electrode lead-out tab are disposed so as to allow the frame body to be stably placed on the flange portion by the protruding portions of the frame body.

The protruding portions 203c and 203d are provided at positions on the frame part opposed, through the space part, respectively to the positions on the frame part at which the protruding portions 203a and 203f are provided. The protruding portions 203b and 203e are provided at positions on the frame part orthogonal to the outer peripheral portion on which the protruding portions 203a and 203f are provided.

In FIG. 2, the protruding portion of the frame body is provided on both surface of the outer peripheral portion of the frame body; however, depending on a shape of the film-covered battery, the protruding portion may be provided only on one side surface.

Providing the frame body can prevent the film-covered battery or a battery module incorporating the film-covered battery in a battery casing from colliding with an inner wall or the like of a battery casing (not illustrated) housing the film-covered battery or battery module even when impact is applied to the battery module or the battery pack.

Further, providing the protruding portions on the frame body prevents violent collision between the flange portion of the film-covered battery and the frame body. A part of the flange portion of the film-covered battery, from which the positive electrode lead-out tab or the negative electrode lead-out tab is drawn, is most vulnerable to impact from the lead-out tab, so that the protruding portion is preferably disposed at a portion opposite to the flange portion where the lead-out tab is provided.

This reduces amplitude of the flange portion where the lead-out tab is provided upon application of the impact, thereby significantly reducing damage of the covering film.

In the present invention, it is preferable to provide the protruding portion at positions on the frame body corresponding at least to the upper end portion 111 and lower end portion 112 or at positions on the frame body corresponding to at least the upper end portion and the both side portions.

A flat surface 209 is formed at a side surface of the outer peripheral portion of the frame body that is opposed to a side surface thereof on the space part side. As a result, when a plurality of film-covered batteries are stacked, and a plurality of frame bodies are disposed accordingly, a fixing member such as an adhesive tape or a reinforcing member can be easily bonded or fixed to the flat surface 209.

Further, for reducing a weight of the battery module, a concave portion 206 may be formed. The concave portion 206 may be formed as a through hole; however, an inner surface side of the outer peripheral portion of the frame body contacts the film covering body, so that the inner surface side is preferably flat. Similarly, the concave portion may be formed in surfaces at the upper and lower end portions that are opposed to the side at which the space part is disposed.

A side surface fastening portion 210a is provided at the side surface of the frame body. Further, another side surface fastening portion is provided on an opposite side to the side surface of the frame body at which the side surface fastening portion 210a is positioned.

As shown by Figures such as FIG. 1, the frame body is placed on the film-covered battery provided with the positive electrode extension tab and negative electrode extension tab. Then, one of the positive and negative extension tabs of the film-covered battery is disposed so as to overlap the side surface fastening portion 210a, and the tab is fixed to the frame body using a fastening means such as screwing, pinning, or welding, whereby the frame body can be disposed between the film-covered batteries connected in series. The side surface fastening portion 210b on the opposite side and the other one of the positive and negative extension tabs can be connected in the same manner.

Figure 3:
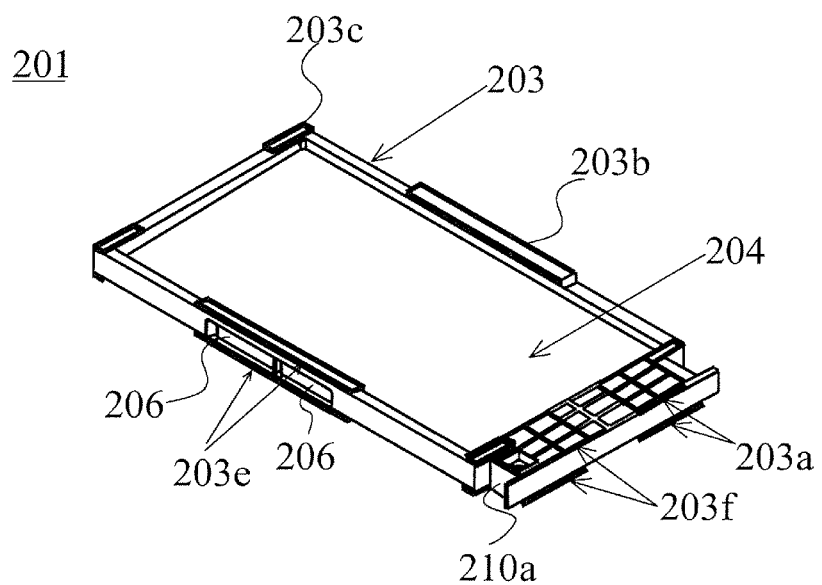
FIG. 3 is a view illustrating a frame body to be attached to the film-covered battery used in the battery module according to the present invention.

FIG. 3 is a view illustrating a box body to be attached to the film-covered battery of the present invention.

Although a configuration in which the positive and negative electrode lead-out tabs of the film-covered battery are drawn from the end portion on the same side is illustrated in FIG. 3, the configuration in FIG. 3 may be appropriately modified according to drawing direction or dimension of the tab.

The space part is formed inside the outer peripheral portion of the frame body 201 illustrated in FIG. 2, whereas in the frame body 201 illustrated in FIG. 3, an intermediate plate 204 is set inside the outer peripheral portion, and concave portions in which both surfaces of the intermediate plate serve as bottom portions thereof are formed in both surfaces of the box body. Other configurations is the same as those of the frame body of FIG. 2, so detailed description thereof will be omitted.

Figure 4:
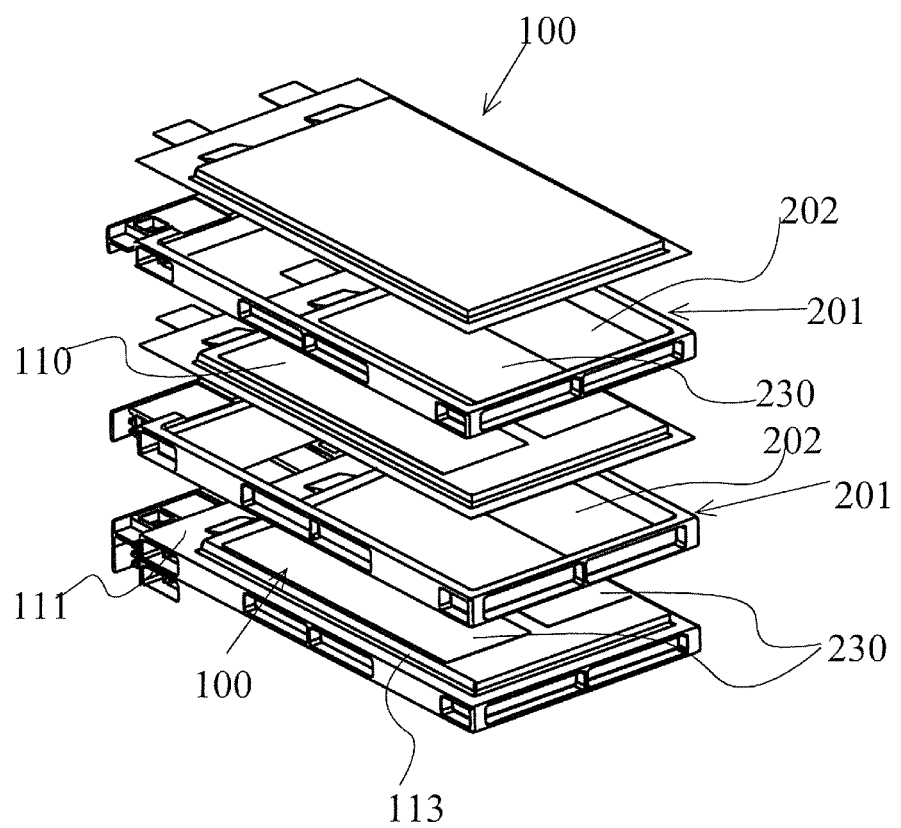
FIG. 4 is a view illustrating an example of an arrangement of the film-covered battery used in the battery module according to the present invention and frame body.

FIG. 4 is a view illustrating a state where the film-covered batteries of FIG. 1 each attached with the frame body are stacked.

Figure 5:
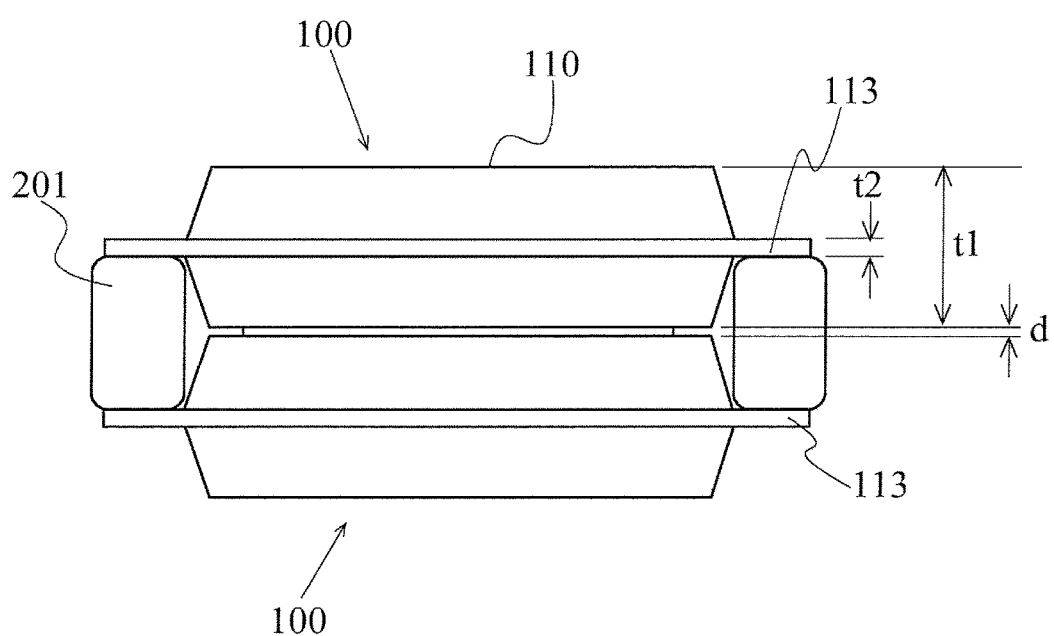
FIG. 5 is a view illustrating an example of a relationship between a thickness of the film-covered battery used in the battery module according to the present invention and a thickness of the frame body.

FIG. 5 is a view illustrating an example of a relationship between a thickness of the film-covered battery and a thickness of the frame body.

The film-covered battery 100 (not illustrated) is disposed at the lowest stage, and the frame body 201 is placed on the flange portion including the upper end portion, the lower end portion, and the side portions 113 formed in the periphery of the battery element housing 110 using the protruding portions formed in the outer peripheral portion of the frame body. In this example, for descriptive convenience, the frame body and the film-covered battery are repeatedly piled up in a state where a main surface of the film-covered battery is set in parallel to a horizontal surface. When the main surface of the film-covered battery is set vertical to a floor surface, the frame body is disposed between the flange portions of the adjacently disposed film-covered batteries.

In FIG. 4, an adhesive member 230 is provided in the battery element housing of the lowest-stage film-covered battery, whereby the film-covered battery placed on the lowest-stage film-covered battery is fixed thereto by the adhesive member. In this state, a thickness of the frame body 201 including the protruding portion is equal to or less than a distance obtained by subtracting a thickness t2 of the flange portion opposite to the protruding portion from a thickness t1 of the film-covered battery.

Further, when the adjacent film-covered batteries are connected through the adhesive member, the thickness of the frame body 201 including the protruding portion is equal to or less than a distance obtained by subtracting the thickness t2 of the flange portion opposite to the protruding portion from a sum of the thickness t1 of the film-covered battery and a thickness d of the adhesive member.

As a result, a load corresponding to only one frame body is applied to the flange of the film-covered battery. Thus, it is possible to significantly reduce a load to be applied to the flange as compared with a conventional configuration in which the film-covered battery is supported mainly by the frame body.

Further, by providing the protruding portion in the flange portion where the electrode lead-out tabs exist and where the maximum load is applied to the battery element housed inside the film-covered battery, it is possible to minimize the amplitude of apart of the flange portion where the electrode lead-out tab which is most vulnerable to damage is positioned to thereby most effectively obtain resistance to the vibration.

Further, the outer peripheral portion of the frame body corresponding to the position where the positive and negative electrode lead-out tabs are provided is made wider in width, so as not to allow leading ends of the positive and negative electrode lead-out tabs to protrude from the outer edge of the frame body. As a result, it is possible to obtain a structure further resistant to externally applied vibration.

Further, when the adjacent film-covered batteries are connected through the adhesive member, the frame body is not a main part that supports the film-covered battery. Thus, even when apart contacting the flange of the film-covered battery is the protruding portion partially provided in the frame body, it is possible to significantly reduce mechanical stress to the flange portion, thereby preventing damage of the flange portion.

Since the protruding portion may be partially provided in the frame body, it is applicable to the film-covered batteries of various thicknesses. For example, the protruding portion formed separately from the frame body may be fitted to the frame body, or the protruding portion may be die-molded using a core piece. As a result, it is possible to provide a frame body, a battery, a battery module, and a battery pack excellent in productivity.

As the adhesive member for fixing the film-covered battery, a double faced adhesive tape or an adhesive such as a hot-melt adhesive may be used. In terms of workability, the double faced adhesive tape is preferably used.

In FIGS. 2 and 3, the film-covered batteries are stacked with the directions of the side from which the positive and negative electrode lead-out tabs are drawn aligned; however, the direction of the side from which the positive and negative electrode lead-out tabs are drawn may be made different.

Further, the frame body is preferably formed such that an outer peripheral edge thereof coincides with or lies outside outer peripheral edges of the upper end portion outer edge 111a, the lower end portion outer edge 112a, and the side portion outer edge 113a.

When a large number of the film-covered batteries are stacked, the configuration described above may be repeated. When the batteries are connected in series, the film-covered batteries are alternately inverted such that the positive and negative electrode tabs overlap each other when the adjacent film-covered batteries are laminated to each other.

Figure 6:
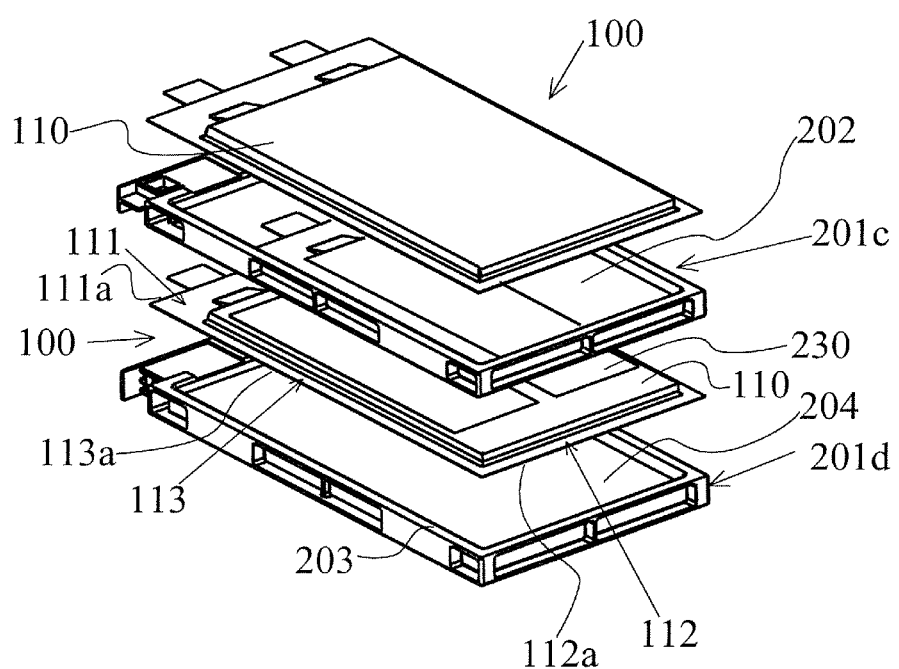
FIG. 6 is a view illustrating another example of the arrangement of the film-covered battery of the present invention and frame body.

In FIG. 4, an example of the battery module in which the frame body of FIG. 2 is placed on the film-covered battery is illustrated; alternatively, however, as illustrated in FIG. 6, the box body and the frame body may be combined to form the battery module.

In FIG. 6, a box body 201d is disposed at the lowest stage, and the film-covered battery is placed on the intermediate plate 204 of the box body. A frame part of a frame body 201c is placed on the flange portion formed around the battery element housing 110 of the film-covered battery 100 disposed at the lowest box body.

Further, another film-covered battery is bonded by the adhesive member 230 to the battery element housing of the film-covered battery disposed at the lowest box body. In this state, a distance between the intermediate plate 204 of the box body and a plane corresponding to a surface 203 of an outer peripheral portion of the box body is equal to or less than a distance between a lower surface of the flange portion of the lowest-stage film-covered battery and an upper surface of the intermediate plate of the box body.

A thickness of the frame body 201c is made equal to or less than a gap between the upper surface of the flange portion of the lowest-stage film-covered battery and the lower surface of the flange portion of the film-covered battery laminated on the lowest-stage film-covered battery. With this configuration, it is possible to prevent the film-covered battery from being retained only by the flange portion corresponding to the outer peripheral portion of the box body or the frame body, there by reducing a load to be applied to the flange portion.

INDUSTRIAL APPLICABILITY

There can be provided a battery module and a battery pack highly resistant to vibration and impact.

REFERENCE SIGNS LIST

100: Film-covered battery
110: Battery element housing

111a: Upper end portion outer edge
112a: Lower end portion outer edge
113: Side portion
113a: Side portion outer edge
120: Positive electrode lead-out tab
122: Positive electrode extension tab
130: Negative electrode lead-out tab
132: Negative electrode extension tab
201, 201a, 201c, 201d: Frame body
202: Space part
203: Frame part
203a, 203b, 203c, 203d, 203e, 203f: Protruding portion

The invention claimed is:

1. A battery module comprising a plurality of stacked film-covered batteries, the stacked film-covered batteries each including:
   a battery element housing that houses therein a battery element;
   a flange portion formed partially or entirely in a covering film around the battery element housing; and
   positive and negative electrode lead-out tabs,
   the battery module further comprising a frame body having an outer peripheral portion and an opening portion inside the outer peripheral portion, wherein
   the outer peripheral portion of the frame body is disposed between the flange portions of adjacent film-covered batteries, and
   a thickness of a part of the frame body is less than a distance obtained by subtracting a thickness of the flange portion from a thickness of a film-covered battery of the plurality of stacked film-covered batteries.

2. The battery module according to claim 1, wherein the film-covered battery is fixed to at least one adjacent film-covered batteries through an adhesive member.

3. The battery module according to claim 1, the battery module comprising two or more frame bodies, wherein the two or more frame bodies are fixed to each other, using an adhesive member, at their outside surfaces which are different from side surfaces defining the opening portions thereof.

4. The battery module according to claim 1, wherein
at least one of the positive electrode lead-out tab and a positive electrode extension tab electrically connected to the positive electrode lead-out tab, and at least one of the negative electrode lead-out tab and a negative electrode extension tab electrically connected to the negative electrode lead-out tab are fixed to the frame body using a fastening member.

5. The battery module according to claim 1, the battery module further comprising a box body having an outer peripheral portion, an intermediate plate inside the outer peripheral portion, and a concave portion in which at least one of side surfaces of the intermediate plate serves as a bottom portion thereof, wherein
the film-covered battery is fixed to the intermediate plate of the box body by an adhesive member, and the film-covered battery fixed to the intermediate plate is fixed to an adjacent film-covered battery through an adhesive member.

6. The battery module according to claim 5, wherein the box body is disposed at an outermost position in a battery module lamination direction.

7. The battery module according to claim 1,
the battery module further comprising a box body having an outer peripheral portion, an intermediate plate inside the outer peripheral portion, and a concave portion in which at least one of surfaces of the intermediate plate serves as a bottom portion thereof, wherein
the film-covered battery is fixed to the intermediate plate of the box body by an adhesive member, and another box body is fixed to the film-covered battery fixed to the intermediate plate through an adhesive member.

* * * * *

UNITED STATES PATENT AND TRADEMARK OFFICE
CERTIFICATE OF CORRECTION

PATENT NO. : 10,236,487 B2
APPLICATION NO. : 14/894553
DATED : March 19, 2019
INVENTOR(S) : Yoshihiro Komiya Page 1 of 1

It is certified that error appears in the above-identified patent and that said Letters Patent is hereby corrected as shown below:

In the Claims

Column 9, Line 34; In Claim 2, after "one", insert --of--

Signed and Sealed this
Thirtieth Day of July, 2019

Andrei Iancu
*Director of the United States Patent and Trademark Office*